US008127362B2

(12) United States Patent
Asahara

(10) Patent No.: US 8,127,362 B2
(45) Date of Patent: Feb. 28, 2012

(54) IMAGE PROCESSING APPARATUS, CONTROL METHOD OF THE APPARATUS, COMPUTER PROGRAM FOR IMPLEMENTING THE METHOD, AND STORAGE MEDIUM

(75) Inventor: Hideo Asahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 954 days.

(21) Appl. No.: 11/833,687

(22) Filed: Aug. 3, 2007

(65) Prior Publication Data

US 2008/0086778 A1 Apr. 10, 2008

(30) Foreign Application Priority Data

Oct. 6, 2006 (JP) ................................ 2006-275731

(51) Int. Cl.
G06F 7/04 (2006.01)
(52) U.S. Cl. ................ 726/26; 726/16; 726/21; 726/27; 358/1.13; 358/1.14; 358/1.15; 713/187; 705/57; 705/58; 380/243
(58) Field of Classification Search ................ 358/1.13, 358/1.14, 1.15; 726/26, 27, 16, 21; 713/187; 705/57, 58; 380/243
See application file for complete search history.

(56) References Cited

U.S. PATENT DOCUMENTS

| 5,694,222 | A | * | 12/1997 | Yamada | ........................ 358/296 |
| 7,266,315 | B2 | * | 9/2007 | Sato | ................................ 399/38 |
| 7,593,122 | B2 | * | 9/2009 | Watanabe et al. | ............ 358/1.14 |
| 2002/0144257 | A1 | | 10/2002 | Matsushima | ................. 717/178 |
| 2004/0046988 | A1 | * | 3/2004 | Hasegawa et al. | ........... 358/1.14 |
| 2004/0075066 | A1 | * | 4/2004 | Hasegawa et al. | ............ 250/556 |
| 2004/0136023 | A1 | * | 7/2004 | Sato | ............................ 358/1.13 |
| 2005/0078332 | A1 | * | 4/2005 | Brown | ......................... 358/1.14 |
| 2006/0015734 | A1 | * | 1/2006 | Atobe | .......................... 713/176 |
| 2006/0026434 | A1 | | 2/2006 | Yoshida et al. | ............... 713/182 |
| 2006/0028667 | A1 | | 2/2006 | Saito | ............................ 358/1.13 |
| 2006/0044587 | A1 | * | 3/2006 | Yoshida | ...................... 358/1.13 |
| 2006/0045555 | A1 | * | 3/2006 | Morimoto et al. | ................ 399/80 |
| 2006/0053124 | A1 | * | 3/2006 | Nishio et al. | .................. 707/100 |
| 2006/0099947 | A1 | * | 5/2006 | Shozaki et al. | ............ 455/435.1 |
| 2006/0126100 | A1 | * | 6/2006 | Jung | ........................... 358/1.14 |
| 2006/0161547 | A1 | * | 7/2006 | Ohtani | ............................. 707/9 |
| 2007/0103712 | A1 | * | 5/2007 | Corona | ........................ 358/1.14 |
| 2007/0107042 | A1 | * | 5/2007 | Corona | ............................. 726/2 |
| 2007/0127051 | A1 | * | 6/2007 | Sakayama et al. | ........... 358/1.14 |
| 2007/0192612 | A1 | * | 8/2007 | Morohashi | .................... 713/176 |

FOREIGN PATENT DOCUMENTS

| JP | A 2002-152446 | 5/2002 |
| JP | 2006-035631 A | 2/2006 |
| KR | 2006-0050269 | 5/2006 |

OTHER PUBLICATIONS http://www1.ipdl.inpit.go.jp/RS1_E/cgi-bin/RS1P400.cgi/1102/, Aug. 19, 2011.*

* cited by examiner

Primary Examiner — April Shan
(74) Attorney, Agent, or Firm — Fitzpatrick, Cella, Harper & Scinto

(57) ABSTRACT

An image processing apparatus acquires restricted function data indicating functions whose execution is restricted, and acquires function data indicating a plurality of functions to be called by script data. The apparatus determines, based on the acquired function data, a realizable function by combining the functions indicated by the function data, and determines, based on the restricted function data and the realizable function, whether to permit execution of the script data corresponding to the function data.

11 Claims, 9 Drawing Sheets

IMAGE PROCESSING APPARATUS, CONTROL METHOD OF THE APPARATUS, COMPUTER PROGRAM FOR IMPLEMENTING THE METHOD, AND STORAGE MEDIUM

BACKGROUND OF THE INVENTION

1. Field of the Invention

The present invention relates to an image processing apparatus that stores combinations of a plurality of functions using script data and executes functions in accordance with the script data, and to a control method of the apparatus.

2. Description of the Related Art

Heretofore, there are methods that restrict the functions of a multifunctional peripheral which a user is able to use with a physical key such as a management key or a card. There are also methods that restrict functions which can be used on the basis of user authentication. The methods of user authentication are also diverse, and include authentication using a card such as an IC card, and authentication performed by a server connected to the multifunctional peripheral via a network. Further, given the conventional difficulties involved in adding or deleting functions, it has been possible to restrict use of the functions of a multifunctional peripheral (functional restrictions) by presetting only the functions that the user is able to use.

However, in recent years, adding and deleting the functions of a multifunctional peripheral has become easy, and is now performed not only by servicepersons but by users and multifunctional peripheral administrators. Not only the functions of a multifunctional peripheral, but also it has become possible to add and delete the authentication function of multifunctional peripherals, making it possible to apply an authentication function that meets user needs to a multifunctional peripheral.

Japanese Patent Laid-Open No. 2002-152446 discloses a technique relating to use restrictions on users using the functions of a device such as a multifunctional peripheral. This technique involves storing menu display data for each user together with identification information on the user, and displaying only those functions included in menu display data matching the identification information of a user when the user has been authenticated. The functions that the user is able to use are thereby restricted.

A technique such as this is also effective in a case that a multifunctional peripheral is provided with a function of executing script data. The definition of script data will be clarified here. The script data stores how the functions of a device such as a multifunctional peripheral are combined. Here, there are assumed to be one or more functions for combining. The script data may be configured to call the functions of a device other than a multifunctional peripheral. The script data may also be configured to store data instructing that functions be executed in parallel or that functions be executed sequentially. Further, a function that executes script data means a function that calls and executes functions in the manner stored in the script data.

Conventionally, a check was made as to whether script data included any functions restricted by functional restrictions, and the script data was not called depending on the result, as aforementioned. However, there are cases where a function that can be implemented by combining a plurality of functions cannot be inhibited despite coinciding with a function that was originally supposed to be restricted by functional restrictions, because of the script data containing a plurality of functions. For example, in a case that "save to box" is combined with "print" and "document delete", an original is read, saved to a box and printed, after which the saved document is deleted, thus resulting in the same operation as the copy operation being executed, even though it was intended to inhibit the copy operation. There are also cases in which a function that can be implemented by combining a plurality of functions is restricted despite not coinciding with a function that was originally supposed to be restricted by functional restrictions. For example, inhibiting "save to box" results in the copy operation that involves temporality storing images in a box also being inhibited, even though the intention was only to inhibit the saving of documents to a box ("save to box").

SUMMARY OF THE INVENTION

An aspect of the present invention is to eliminate the above-mentioned conventional problems.

Moreover another aspect of the present invention is to provide functional restrictions specific to each user, with respect to users that use script data to realize functions.

According to an aspect of the present invention, there is provided an image processing apparatus for executing functions described by script data, comprising:
  a restricted function data acquisition unit configured to acquire restricted function data indicating functions whose execution by a user of the image processing apparatus is restricted;
  an executable function data acquisition unit configured to acquire function data indicating a plurality of functions to be called by script data;
  a combined function determination unit configured to determine, based on the function data acquired by the executable function data acquisition unit, a realizable function by combining the functions indicated by the function data; and
  a determination unit configured to determine, based on the restricted function data acquired by the restricted function data acquisition unit and the realizable function determined by the combined function determination unit, whether to permit execution of the script data corresponding to the function data.

According to another aspect of the present invention, there is provided an image processing apparatus for executing functions described by script data, comprising:
  a restricted function data acquisition unit configured to acquire restricted function data indicating functions whose execution by a user of the image processing apparatus is restricted;
  an executable function data acquisition unit configured to acquires basic function data indicating a plurality of basic functions to be called by script data;
  a combined function determination unit configured to determine, based on the basic function data acquired by the executable function data acquisition unit, a realizable function by combining the basic functions indicated by the basic function data; and
  a determination unit configured to determine, based on the restricted function data acquired by the restricted function data acquisition unit and the realizable function determined by the combined function determination unit, whether to permit execution of the script data corresponding to the basic function data.

According to another aspect of the present invention, there is provided a control method of an image processing apparatus for executing functions described by script data, comprising:

a restricted function data acquisition step of acquiring restricted function data indicating functions whose execution by a user of the image processing apparatus is restricted;

an executable function data acquisition step of acquiring function data indicating a plurality of functions to be called by script data;

a combined function determination step of determining, based on the function data acquired in the executable function data acquisition step, a realizable function by combining the functions included in the function data; and a determination step of determining, based on the restricted function data acquired in the restricted function data acquisition step and the realizable function determined the combined function determination step, whether to permit execution of the script data corresponding to the function data.

According to another aspect of the present invention, there is provided a control method of an image processing apparatus for executing functions described by script data, comprising:

a restricted function data acquisition step of acquiring restricted function data indicating functions whose execution by a user of the image processing apparatus is restricted;

an executable function data acquisition step of acquiring basic function data indicating a plurality of basic functions to be called by script data;

a combined function determination step of determining, based on the basic function data acquired in the executable function data acquisition step, a realizable function by combining the basic functions indicated by the basic function data; and a determination step of determining, based on the restricted function data acquired in the restricted function data acquisition step and the realizable function determined in the combined function determination step, whether to permit execution of the script data corresponding to the basic function data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Numerous embodiments of the present invention will now herein be described in detail with reference to the accompanying drawings. Note that the following embodiments are not intended to limit the present invention set forth in the claims, and that not all combinations of the features described in the embodiments are necessarily essential as means for attaining the objects of the invention.

Figure 1:
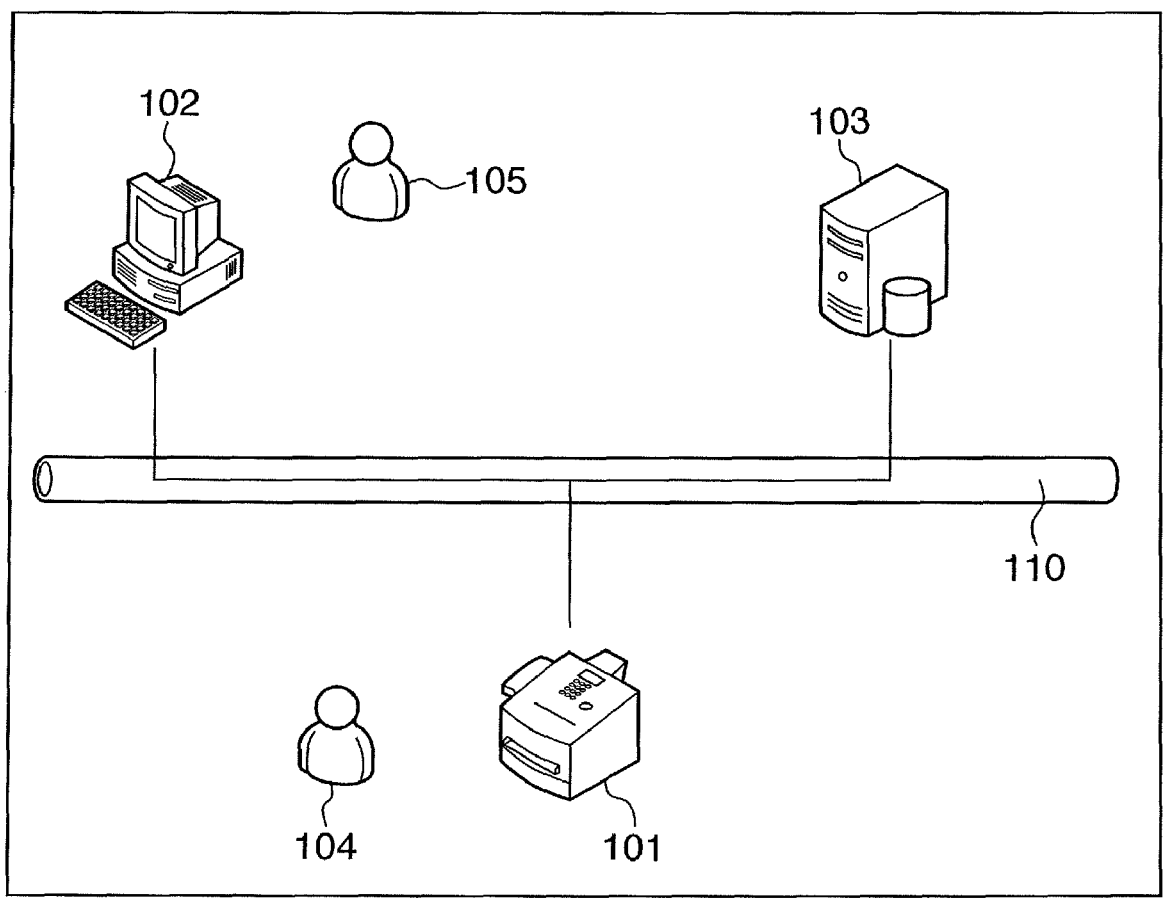
FIG. 1 is a diagram illustrating a network according to an exemplary embodiment of the present invention.

FIG. 1 is a diagram illustrating an example of a network according to an exemplary embodiment of the present invention.

In this network, a multifunctional peripheral 101 is connected to a LAN 110 together with a client terminal 102 and an authorization management server 103 in a mutually communicable state. The client terminal 102 is able to communicate with the authorization management server 103 via the LAN 110, and the authorization management server 103 can be operated from the client terminal 102. The authorization management server 103 can communicate with the multifunctional peripheral 101 and the client terminal 102 via the LAN 110. The authorization management server 103 is provided with a mass storage in which are stored execution restrictions for each user with respect to the functions of the multifunctional peripheral 101. For example, execution restrictions can be set in the multifunctional peripheral 101 with respect to reading an original or saving an original to a box, and to printing, sending or copying a document saved to a box. Required pieces of information relating to the execution restrictions for each user are extracted when requested by the multifunctional peripheral 101, and sent from the authorization management server 103 to the multifunctional peripheral 101 in response to the request.

Note that in FIG. 1, the reference numeral 104 denotes a user of the multifunctional peripheral 101, while the reference numeral 105 denotes a user of the client terminal 102.

Note also that in the above description the authorization management server 103 stores the information relating to the execution restrictions on the functions of the multifunctional peripheral 101, and the multifunctional peripheral 101 refers to this information via the LAN 110, although the present invention is not limited to this configuration. For example, a storage apparatus provided in the multifunctional peripheral 101 may store the information relating to the execution restrictions, and the multifunctional peripheral 101 may refer to this information as necessary.

Although execution restrictions on the functions can be separately set for each user in the present embodiment, the present invention is not limited to this configuration. For example, execution restrictions on the functions may be commonly set for all users, or may be set for each user group composed of a plurality of users.

Further, in the present embodiment, the authorization management server 103 is operated from the client terminal 102, although the present invention is not limited to this configuration. For example, the authorization management server 103 may be provided with its own user interface, and a user (not shown) of the authorization management server 103 may directly operate the authorization management server 103.

Note that in the following description, the multifunctional peripheral 101 rather than the authorization management server 103 is able to set execution restrictions on the functions, although the setting of execution restrictions may, of course, be performed by the authorization management server 103, as aforementioned.

Figure 2:
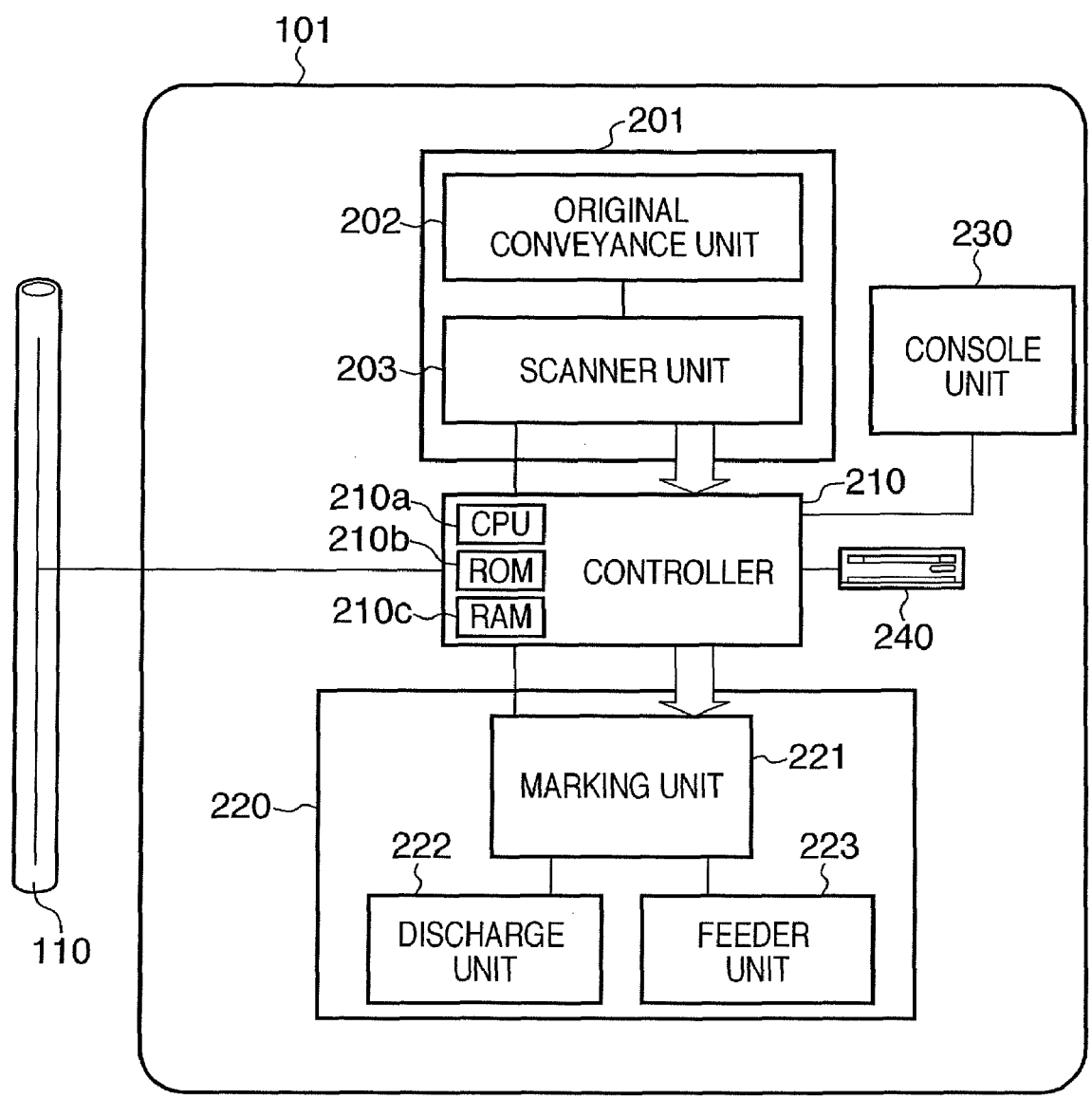
FIG. 2 is a block diagram showing an example of the hardware configuration of a multifunctional peripheral according to the embodiment of the present invention.

FIG. 2 is a block diagram showing an example of the hardware configuration of the multifunctional peripheral 101 according to the present embodiment.

A reader unit 201 optically reads an original and converts the read original to image data. This reader unit 201 has an original conveyance unit (document feeder) 202 having a function of conveying the original, and a scanner unit 203 that has a function of reading the original. Note that depending on the configuration of the multifunctional peripheral 101, the original conveyance unit 202 need not be included (the original is read by the scanner unit 203 after manually being placed on so-called platen glass).

A printer unit 220 transports a recording paper, prints the image data onto the recording paper as a visible image, and discharges the printed recording paper to the outside of the apparatus. The printer unit 220 includes a feeder unit 223 that has plural types of recording paper cassettes, a marking unit 221 that transfers and fixes the image data to the recording paper, and a discharge unit 222 that sorts and staples the printed recording paper, and discharges the sorted and stapled recorded paper to the outside of the apparatus. A controller 210 administers control of the entire multifunctional peripheral 101, and includes a CPU 210*a*, a ROM 210*b* and a RAM 210*c*. The controller 210 is electrically connected to the reader unit 201 and the printer unit 220, and is further connected to the LAN 110.

Note that the CPU 210*a* in the controller 210 controls the operations of the entire multifunctional peripheral 101 in accordance with computer programs stored in the RAM 210*c*. The ROM 210*b* stores boot programs and various data in a nonvolatile state. The RAM 210*c* provides a work area for storing various data in a case that controls are performed by the CPU 210*a*. The operating system (OS) and application programs executed by the CPU 210*a* are installed in an HDD 240, and loaded in the RAM 210*c* from the HDD 240 in accordance with the boot programs stored in the ROM 210*b* when power is turned on, then the programs stored in the RAM 210*c* are implemented under the control of the CPU 210*a*.

The controller 210 provides a copy function by controlling the reader unit 201 to read the image data of the original and controlling the printer unit 220 to print the read image data onto the recording paper. The controller 210 also provides a network scanner function by converting image data read by the reader unit 201 into code data, and transmitting the code data to the client terminal 102 or the like via the LAN 110. The controller 210 also provides a box scan function for registering image data read by the reader unit 201 in a box provided in the HDD 240. The controller 210 further provides a print function for converting code data received from the client terminal 102 via the LAN 110 into image data, and outputting the image data to the printer unit 220 to print it. A console unit 230 has an LCD display, a touch panel input apparatus affixed to the LCD display and a plurality of hard keys, and provides a user interface for the user to perform various operations. Signals input using the touch panel or hard keys are conveyed to the controller 210, and the LCD display displays image data sent from the controller 210.

Figure 3:
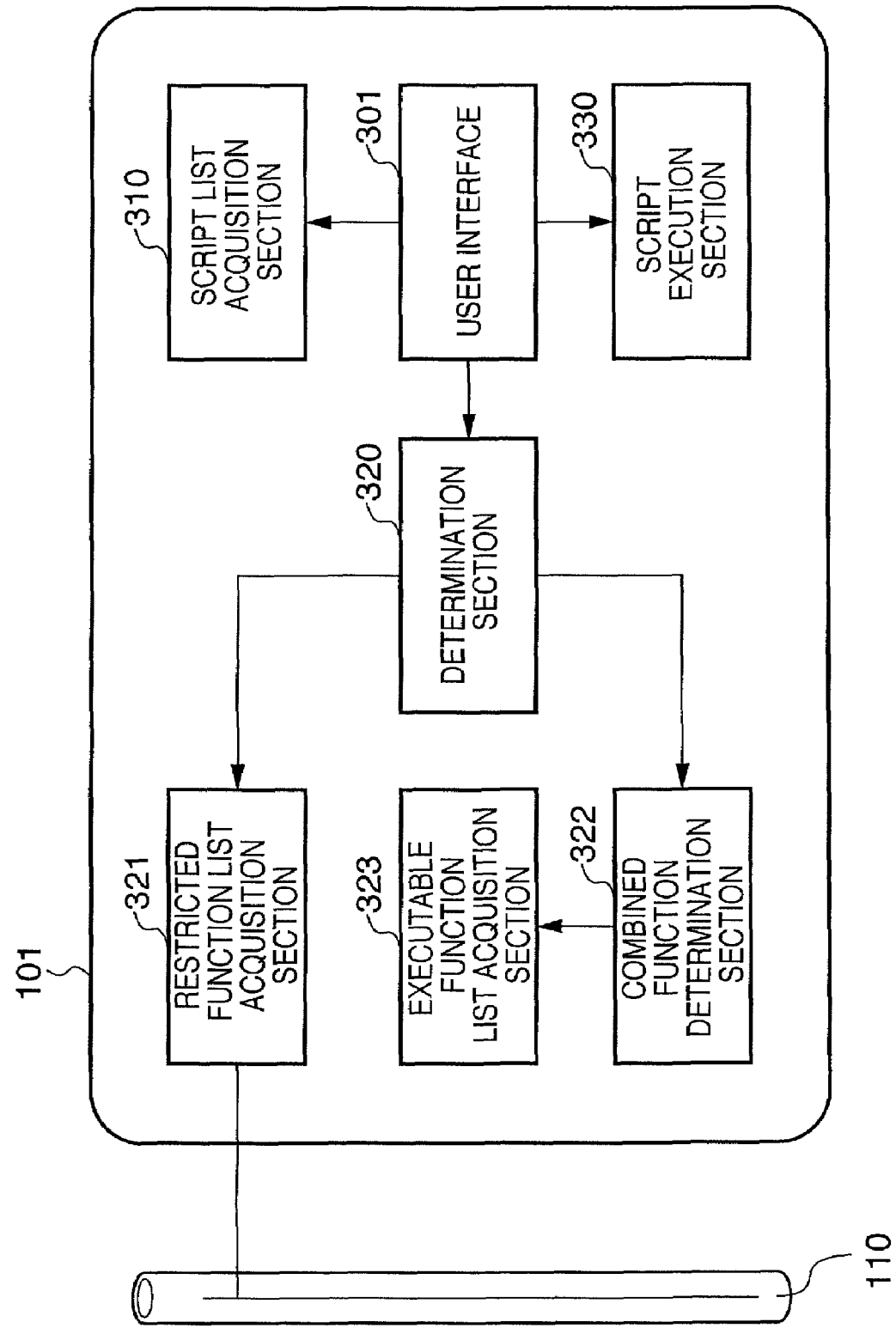
FIG. 3 is a functional diagram illustrating an example of the software configuration of the multifunctional peripheral according to the embodiment of the present invention.

FIG. 3 is a functional diagram illustrating an example of the software configuration of the multifunctional peripheral 101 according to the present embodiment.

A user interface 301 is linked to the console unit 230, and receives instructions from the user 104. In the present embodiment, the user interface 301, on receipt from the user 104 of an instruction to display a list of script data stored in the multifunctional peripheral 101 or an instruction to execute script data, displays a list of script data or executes script data in accordance with the instruction. In the list display of script data, a determination section 320 that determines whether script data is executable (described below) determines whether or not script data is executable, and identifiably displays the determination result to the user.

Here, the definition of the script data according to the present embodiment is as aforementioned. That is, the script data stores how the (basic) functions of a device such as a multifunctional peripheral are combined. Here, there is assumed to be one or more (basic) functions for combining. The script data may be configured to call the functions of a device other than a multifunctional peripheral. The script data may also be configured to store data instructing that (basic) functions be executed in parallel or that (basic) functions be executed sequentially. Further, a function that executes the script data means a function that calls and executes (basic) functions in the manner stored in the script data. Note that the script data is stored in the HDD 240 of the multifunctional peripheral 101. It is possible to register a plurality of items of script data in the multifunctional peripheral 101, in which case a plurality of items of script data are stored in the HDD 240.

Figure 4:
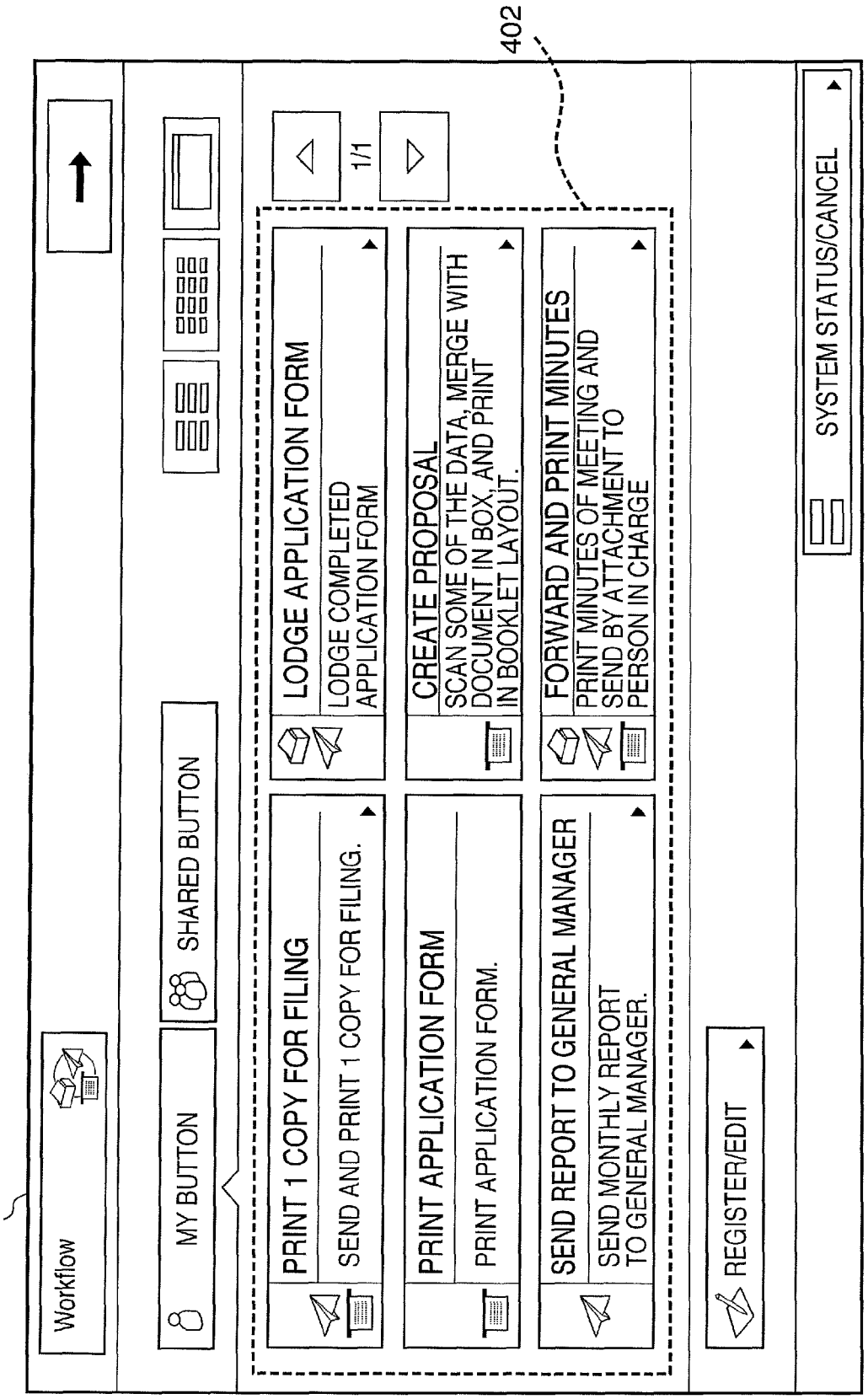
FIG. 4 depicts a view illustrating an exemplary user interface screen for calling script data displayed on a display of a console unit of the multifunctional peripheral according to the embodiment of the present invention.

FIG. 4 depicts a view illustrating an exemplary user interface screen for calling script data displayed on the display of the console unit 230 of the multifunctional peripheral 101 according to the present embodiment.

A list screen 401 displays a list of script data stored in the multifunctional peripheral 101. Here, a single corresponding button is displayed for each item of script data registered in the multifunctional peripheral 101, resulting in a plurality of buttons such as script call buttons 402 being disposed.

Although buttons corresponding to the script data are displayed in the present embodiment, the present invention is not limited to this configuration. For example, if a fixed display position is stored for each item of script data and the corresponding item of script data does not exist, it is possible either to not display a button in that display position or to shade the button corresponding to the item of script data.

When the user depresses a desired one of the script call buttons 402 in the console unit 230, execution of the script data corresponding to that button is instructed. Note that, alternatively, a configuration is possible in which the user, by depressing a button, selects a function corresponding to the button, and instructs the execution of the function using a different user interface.

Figure 5:
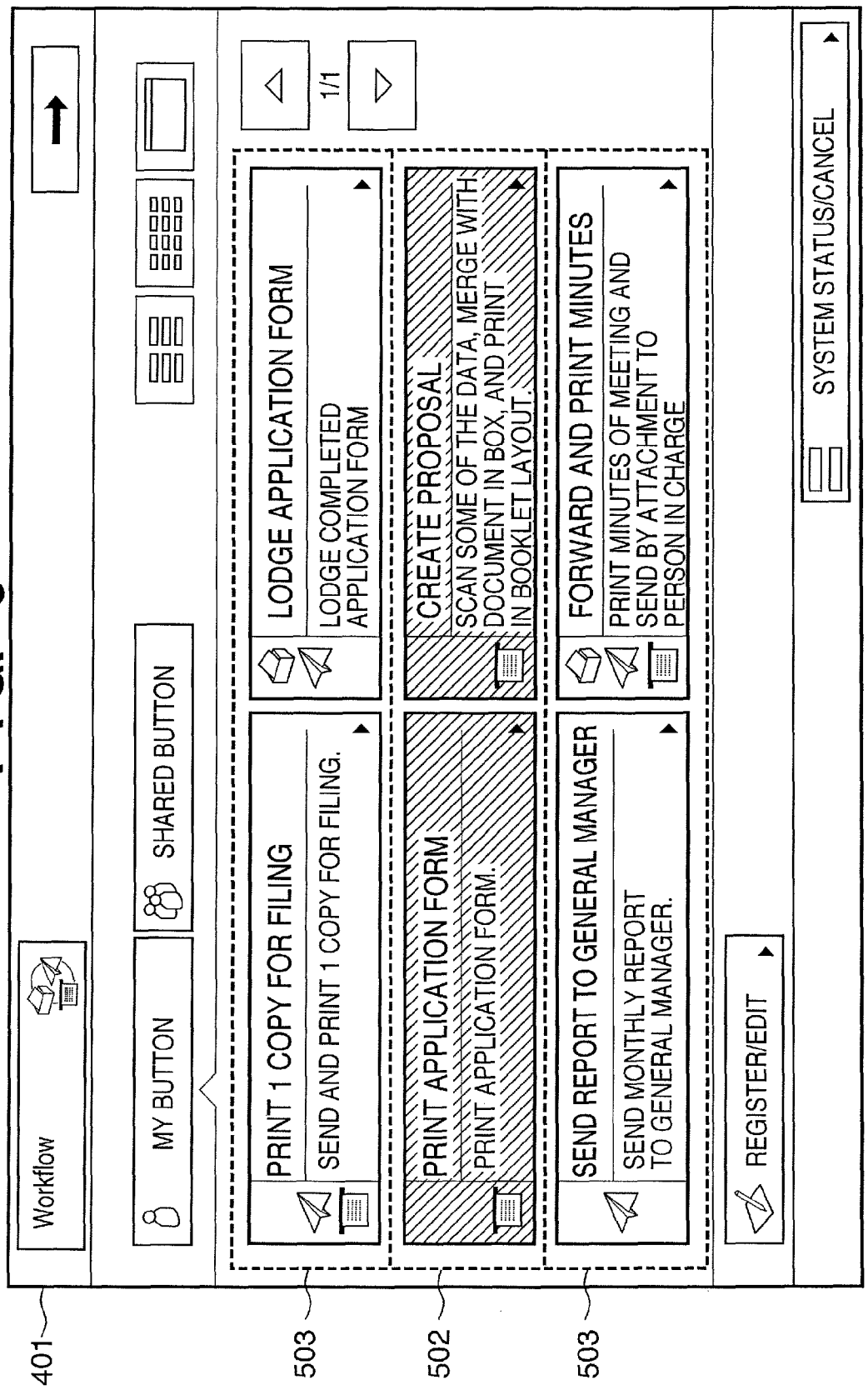
FIG. 5 depicts a view illustrating an exemplary user interface screen for calling script data displayed on the display of the console unit of the multifunctional peripheral according to the embodiment of the present invention.

Also, at this time, the button corresponding to the script data for which a function corresponding to the script data is determined by the determination section 320 to not be executable is displayed as shown in FIG. 5, for example.

FIG. 5 depicts a view illustrating an exemplary user interface screen for calling script data displayed on the display of the console unit 230 of the multifunctional peripheral 101 according to the present embodiment.

In FIG. 5, non-executable buttons 502 and executable buttons 503 are displayed on the list screen 401. Since the non-executable buttons 502 showing functions that cannot be executed are shaded in gray, the user is able to easily identify that these buttons correspond to functions that cannot be executed. That is, in the list screen 401 of FIG. 4, the functions corresponding to all of the script call buttons can be implemented, whereas in the FIG. 5 example, it is explicitly indicated that the functions "Print application form" and "Create proposal" shown by the buttons 502 cannot be executed.

Note that although a button corresponding to script data determined to not be executable is displayed with a gray shaded button in the present embodiment, the present invention is not limited to this configuration. For example, an icon or characters showing that the function cannot be executed may be displayed on the button, the size of the button may be changed, or the button itself may be hidden.

A script list acquisition section 310 in FIG. 3 acquires script data held by the multifunctional peripheral 101. Note that this script data is stored in the HDD 240 provided in the multifunctional peripheral 101.

Although script data is stored in the HDD 240 provided in the multifunctional peripheral 101 in the present embodiment, the present invention is not limited to this configuration. For example, the multifunctional peripheral 101 may refer to and use script data stored in a different information processing device communicable via the LAN 110.

The determination section 320 determines whether or not script data is executable based on information in a list of restricted functions (restricted function list) acquired by a restricted function list acquisition section 321 (described below) and a list of functions realizable by combining functions included in script data (function list) acquired by a combined function determination section 322 (described below). The result of this determination is temporarily stored in the memory (RAM 210c or HDD 240) of the controller 210, for example, and notified to the user interface 301.

The restricted function list acquisition section 321 acquires a restricted function list showing information about execution restrictions set with respect to the user logged into the multifunctional peripheral 101 from the authorization management server 103 via the LAN 110.

Figure 6:
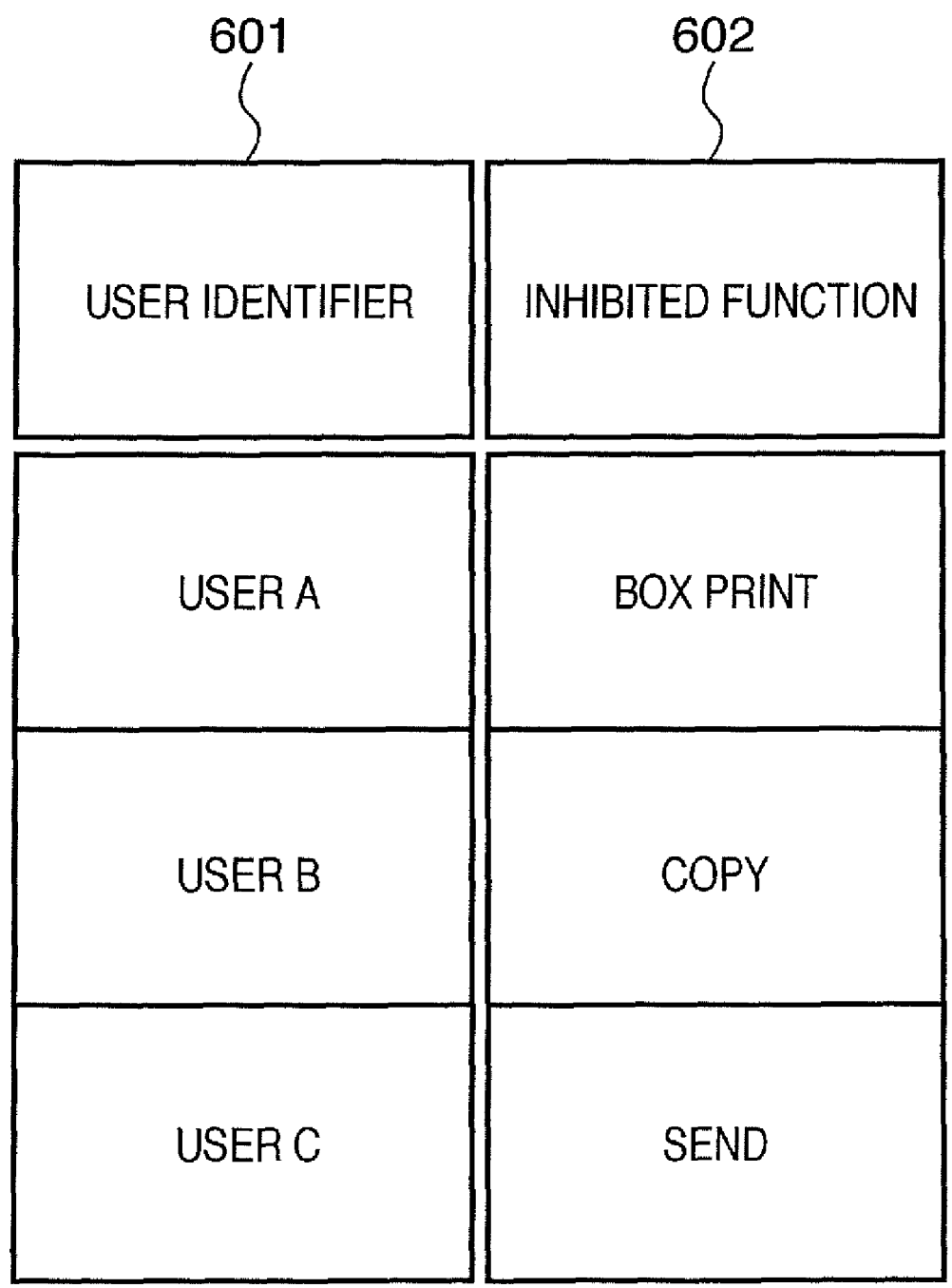
FIG. 6 depicts a view illustrating an exemplary restricted function list according to the embodiment of the present invention.

FIG. 6 depicts a view illustrating an exemplary restricted function list according to the embodiment of the present invention.

In FIG. 6, a user identifier 601 stores identifiers registered in the authorization management server 103 for identifying users. Here, the character strings user A, user B and user C are given as each exemplary user identifier. Note that although character strings are used as the user identifier in the present embodiment, the present invention is not limited to this configuration. For example, characteristic values obtained by a biometric authentication device may be used as the user identifier.

An inhibited function 602 stores a list of functions whose execution by each user corresponding to the user identifier 601 is inhibited or restricted. Here, "box print" is registered as a function that the user A is not able to use, for example. The restricted function list shown in FIG. 6 may be not a list formation but may include information for linking the user identifier with the inhibited function. Note that although a list of functions whose execution is inhibited for each user is acquired by the restricted function list acquisition section 321 in the present embodiment, the present invention is not limited to this configuration. For example, a list of functions whose execution is permitted for each user may be acquired.

The combined function determination section 322 determines what functions are realized by combining the functions acquired by an executable function list acquisition section 323 (described below).

Figure 7:
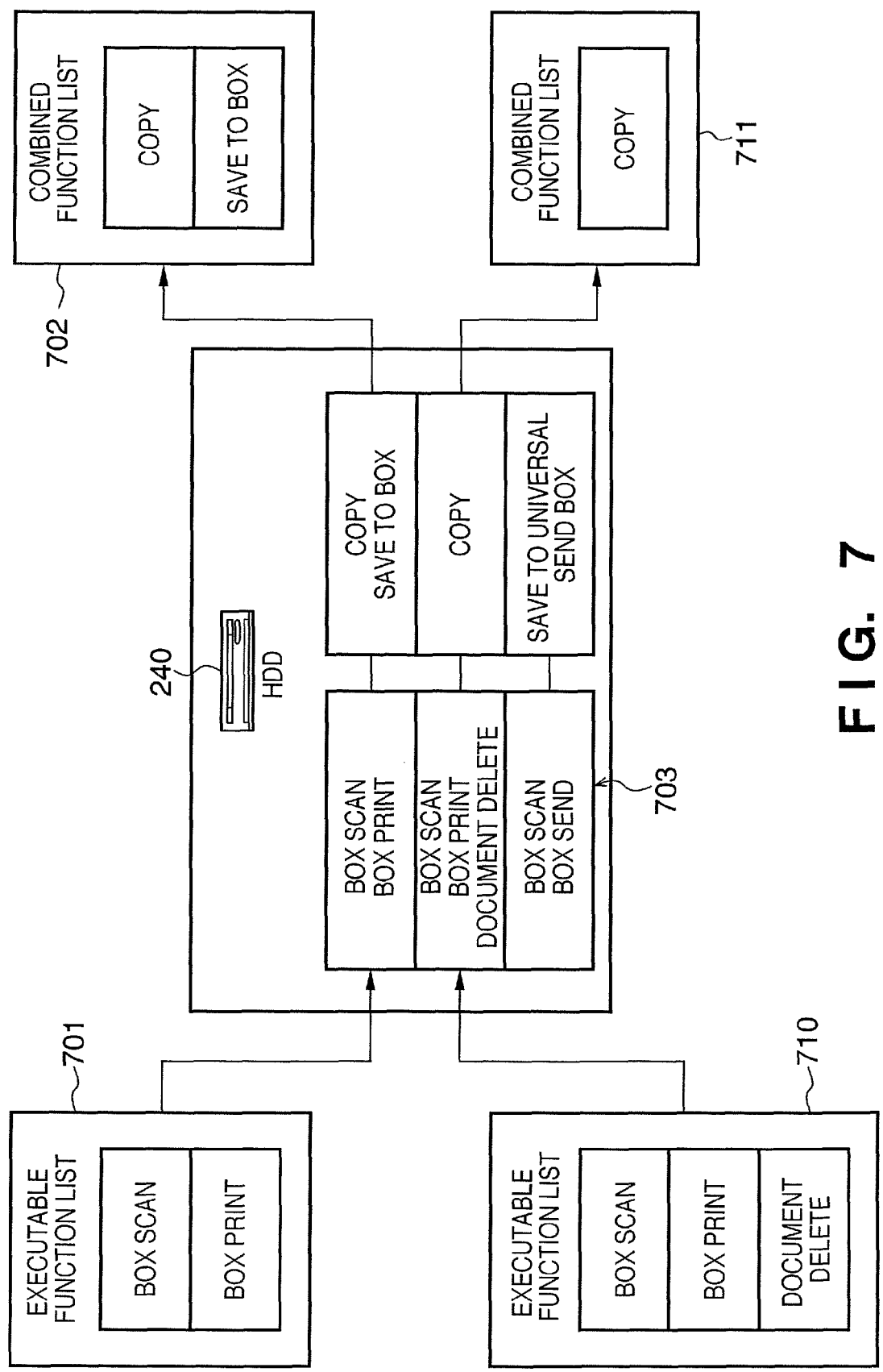
FIG. 7 depicts a view illustrating processing by a combined function determination section of the multifunctional peripheral according to the embodiment of the present invention.

FIG. 7 depicts a view illustrating processing by a combined function determination section of the multifunctional peripheral according to the embodiment of the present invention.

Two examples will be described using FIG. 7. The first example involves generating a combined function list 702 from an executable function list 701 and combining information 703. Here, the executable function list 701 shows (basic) functions acquired by the executable function list acquisition section 323. In the given example, "box scan" and "box print" have been acquired as executable (basic) functions.

The combined function list 702 is a list obtained by the combined function determination section 322 from the executable function list 701 and the combining information 703 (described below). Here, the combined function list 702 is obtained by retrieving the relevant combination from the combining information 703, based on the information in the executable function list 701. Specifically, "save to box" and "copy" in the combining information 703 that contains the "box scan" and "box print" functions of the executable function list 701 are obtained as functions realized by combining the functions in the executable function list 701.

Here, the "save to box" function is added to the combined function list 702 because digital data generated by reading the original using the (basic) function "box scan" is stored in a box. The "copy" function is added to the combined function list 702 because a function equivalent to copying can be provided, since digital data generated by reading the original using the (basic) function "box scan" is printed as is using the (basic) function "box print". Functions thus included in the combined function list 702 are executed by a script execution section 330.

The combining information 703 shows information about functions realized by combining the (basic) functions executable using script data. This combining information 703 is prestored in the HDD 240 of the multifunctional peripheral 101 for all combinations of the (basic) functions.

In the present embodiment, all combinations of the (basic) functions are prestored in the HDD 240 of the multifunctional peripheral 101, and this information is retrieved from the HDD 240, although other configurations are also possible. For example, functions to be provided to a user may be calculated by modeling the processing content of each (basic) function and deriving a final result with logical operations. Information about all of the combinations may also be incorporated into program code.

The second example involves generating a combined function list 711 from an executable function list 710 and the combining information 703.

The executable function list 710 shows (basic) functions acquired by the executable function list acquisition section 323. In the given example, "box scan", "box print" and "document delete" have been acquired as executable (basic) functions. The combined function list 711 is a list of functions obtained by the combined function determination section 322 from the executable function list 710 and the combining information 703. Here, the combined function list 711 is obtained by retrieving the relevant combination from the combining information 703, based on the information in the executable function list 710.

Specifically, the "copy" function is obtained based on the combining information 703 from the three (basic) functions "box scan", "box print" and "document delete" to form the combined function list 711. Here, the "copy" function is obtained as a result of combining the functions in the executable function list 710 for the same reason given above. Unlike the combined function list 702, however, the function "save to box" is not obtained as a result of combining the functions in the executable function list 710, because the read document is ultimately deleted using "document delete" and is not saved in the box.

The executable function list acquisition section 323 acquires a list of (basic) functions included in script data instructed by the combined function determination section 322. Note, the executable function lists 701 and 710 may not be list formation but may include information for indicating (basic) functions obtained by the executable function list acquisition section 323. Further, the combined function lists 702 and 711 may not be list formation but may include information for indicating the functions instructed by the combined function determination section 322 based on the executable function lists 701 and the combining information 703.

Figure 8:
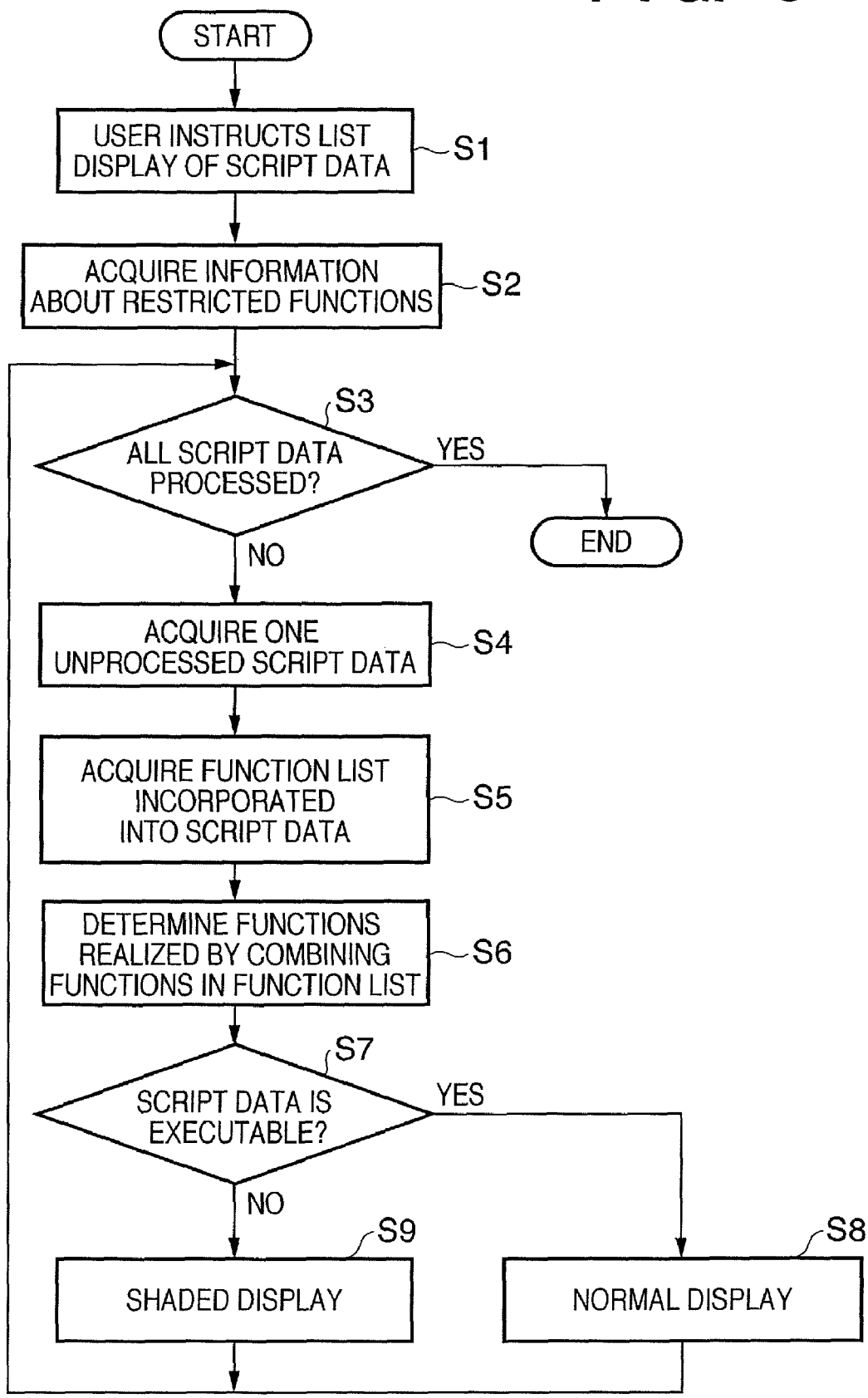
FIG. 8 is a flowchart illustrating a script list display process in the multifunctional peripheral according to the embodiment of the present invention.

FIG. 8 is a flowchart illustrating a script list display process in the multifunctional peripheral 101 according to the present embodiment. Note that the computer program for executing this flowchart is loaded in the RAM 210*c* of the controller 210, and executed under the control of the CPU 210*a*.

Firstly, in step S1, the list screen 401 is displayed on the display as the result of a user operation via the user interface 301. Next, the processing proceeds to step S2, where a list of restricted functions is acquired by the restricted function list acquisition section 321. Note that, here, a restricted function list (FIG. 6) showing information about execution restrictions set with respect to the user logged into the multifunctional peripheral 101 is acquired from the authorization management server 103 via the LAN 110. Next, the processing proceeds to step S3, where it is checked whether the determination as to whether or not script data is executable has been completed for all script data displayed in the list, and if completed, this processing is ended.

If, in step S3, the processing has not been completed for all script data displayed in the list, the processing proceeds to step S4, where one item of the script that has not yet been processed is acquired. In step S5, the (basic) functions to be called by the script data acquired in step S4 are then acquired by the executable function list acquisition section 323. Next, the processing proceeds to step S6, where it is determined, from the list of (basic) functions acquired in step S5, what functions can be realized by combining these (basic) functions. This processing is executed by the combined function determination section 322.

Next, the processing proceeds to step S7, where it is determined by the determination section 320 whether or not the script data acquired in step S4 is executable. If executable, the processing proceeds to step S8, where the script data acquired in step S4 is displayed normally. On the other hand, if it is determined in step S7 that the script data acquired in step S4 is not executable, the processing proceeds to step S9, where the script data is shaded to explicitly indicate that the functions corresponding to the script data cannot be executed.

Hereinafter, examples will be given of the determination as to whether or not script data is executable, realized by executing the flowchart of FIG. 8.

(1) Script data composed of "save to box" and "box print" is registered in the multifunctional peripheral 101, and execution of "save to box" by the user logged into the multifunctional peripheral 101 is restricted.

Here, the functions realized by combining these functions are "copy" and "save to box", similarly to the example in which the combined function list 702 is generated from the executable function list 701 and the combining information 703 in FIG. 7.

In this case, the script data cannot be executed, since execution of "save to box" by the user logged into the multifunctional peripheral 101 is restricted.

(2) Script data composed of "save to box", "box print" and "document delete" is registered in the multifunctional peripheral 101, and execution of "save to box" by the user logged into the multifunctional peripheral 101 is restricted.

Here, the function realized by combining these functions is "copy", similarly to the example in which the combined function list 711 is generated from the executable function list 710 and the combining information 703 in FIG. 7.

In this case, the script data can be executed, since the execution of the "copy" function by the user logged into the multifunctional peripheral 101 is not restricted. According to the present embodiment, even if the script data contains "save to box" whose execution by the user is restricted, the execution of the script data is permitted, because the function realized by executing the script data is equivalent to "copy". Consequently, functional restrictions corresponding to functions whose execution was originally intended to be restricted can be realized.

Note that although functions whose execution is restricted are acquired in step S2 in the present embodiment, the present invention is not limited to this configuration. For example, functions whose execution is restricted may be acquired at a time when the user 104 logs into the multifunctional peripheral 101.

In the present embodiment, it is determined whether or not the execution of functions corresponding to script data is restricted when the list of script data is displayed, although the present invention is not limited to this configuration. For example, the processing of steps S5 to S7 may be performed on script data at the point at which the user 104 of the multifunctional peripheral 101 instructs the execution of the script data, and if the script data cannot be executed, the processing may be ended with a script error and a warning may be performed with respect to the user.

Although execution of script data is instructed from the user interface 301 in the present embodiment, the present invention is not limited to this configuration. For example, a configuration such as shown in FIG. 9 is conceivable instead of the configuration in FIG. 3.

Figure 9:
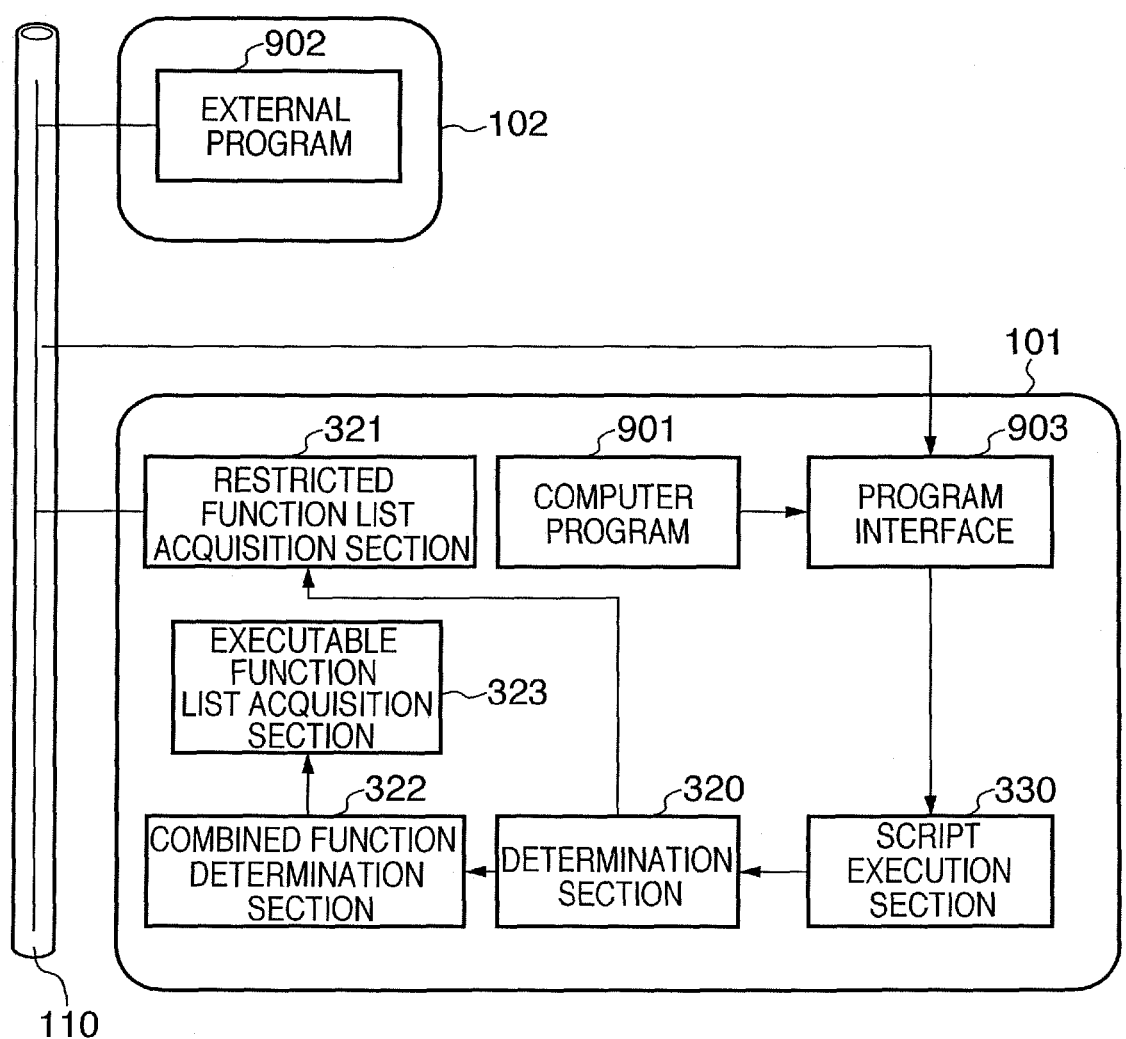
FIG. 9 is a functional diagram illustrating the software configuration of a multifunctional peripheral according to another exemplary embodiment of the present invention.

FIG. 9 is a functional diagram illustrating the software configuration of the multifunctional peripheral 101 according to another exemplary embodiment of the present invention. Note that parts common with the above FIG. 3 are shown with the same reference numerals, and related description will be omitted.

A computer program 901 calls a program interface 903 (described below) using a general method call, and instructs the execution of script data. An external program 902 operates on the client terminal 102. As a result of this external program 902, the client terminal 102 is able to call the program interface 903 via the LAN 110 and instruct the execution of script data. Note that communication between the external program 902 and the program interface 903 is realized by a function call using a SOAP message.

Although a function call using a SOAP message is performed in the present exemplary embodiment, other configurations may be used. For example, functions may be called using a web service. Alternatively, functions may be called using socket communication.

The program interface 903 is called by another program and controls the execution of script data. Firstly, the program interface 903 calls The determination section 320 and determines whether the script data is executable. If determined that the script data cannot be executed, the program interface 903 notifies the caller of the script data, without calling the script execution section 330. On the other hand, if determined that the script data can be executed, the program interface 903 calls the script execution section 330 and executes the script data.

Note that although the program interface 903 calls the determination section 320 in the present embodiment, the present invention is not limited to this configuration. For example, the script execution section 330 may call the determination section 320 and notify the program interface 903 of the result.

Further Embodiments

While embodiments of the present invention have been detailed above, the present invention may be applied to a system constituted by a plurality of devices, or to an apparatus composed of a single device.

Note that the present invention can also be accomplished as the result of a software program for realizing the functions of the above embodiments being supplied either directly or remotely to a system or an apparatus, and the supplied program being read and executed by a computer in the system or apparatus. In this case, the configuration need not be a computer program, provided that the function of a computer program exists.

Consequently, since the functional processing of the present invention is realized with a computer, the actual program code installed on the computer also realizes the present invention. That is, the actual computer program for realizing the functional processing of the present invention is also included in the claims of the present invention. In this case, the computer program may take any form, such as an object code, a computer program executed by an interpreter or script data supplied to an OS, provided that the function of a computer program exists.

Various storage media can be used to supply the computer program. These include, for example, Floppy (registered trademark) disk, hard disk, optical disk, magneto optical disk, MO, CD-ROM, CD-R, CD-RW, magnetic tape, nonvolatile memory card, ROM, and DVD (DVD-ROM, DVD-R).

Alternatively, the computer program can also be supplied by connecting to a website on the Internet using the browser of a client computer, and downloading the computer program from the website to a storage medium such as a hard disk. In this case, the actual computer program of the present invention may be downloaded, or a compressed file including an auto-install function may be downloaded. This can also be realized dividing program code constituting the computer program of the present invention into a plurality of files, and downloading the respective files from different websites. That is, a World Wide Web (WWW) server that allows a plurality of users to download program files for realizing the functional processing of the present invention with a computer is also included in the claims of the present invention.

The computer program of the present invention may also be delivered to a user in encrypted form stored on a storage medium such as a CD-ROM. In this case, a user that satisfy prescribed conditions is allowed to download key information for decrypting the encryption from a website via the Internet, and the computer program decrypted using this key information is installed on a computer in an executable format.

The present invention can be realized in forms other than those in which the functions of the embodiments described above are realized as a result of a computer executing the read computer program. For example, an OS or the like running on a computer can perform part or all of the actual processing, based on the instructions of the computer program, and the functions of the above embodiments can be realized as a result of this processing.

Further, the computer program read from the storage medium may also be written to a memory provided in a function extension board inserted in a computer or a function extension unit connected to a computer. In this case, a CPU or the like provided in the function extension board or the function extension unit then performs part or all of the actual processing based on the instructions of the computer program, and the functions of the above embodiments are realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-275731, filed Oct. 6, 2006, which is hereby incorporated by reference herein in its entirety.

What is claimed is:

1. An image processing apparatus for executing functions described by script data, comprising:
   a processor; and
   a memory having stored thereon instructions which, when executed by the processor, cause the processor to:
   acquire restricted function data indicating functions whose execution by a user of the image processing apparatus is restricted,
   acquire executable function data indicating a plurality of functions to be called by the script data,
   determine a realizable function which is realized by executing a plurality of executable functions that are called by the script data, and
   determine whether to permit execution of the script data corresponding to the executable function data, based on the acquired restricted function data and the determined realizable function, wherein the determination of the realizable function includes a determination of whether to permit execution of the script data corresponding to the executable function data regardless of whether or not each of the executable functions to be called by the script data is restricted by the restricted function data.

2. The image processing apparatus according to claim 1, wherein the processor is also caused to:
   acquire callable script data; and
   display a list of the acquired callable script data, and display the script data determined to not be executable to the user in an identifiable form.

3. The image processing apparatus according to claim 1, wherein the processor is also caused to:
   notify the user of a result of the determination whether to permit execution of the script data corresponding to the executable function data.

4. The image processing apparatus according to claim 1, wherein the processor is also caused to:
   notify an external module that instructed execution of the script data of a result of the determination whether to permit execution of the script data corresponding to the executable function data.

5. The image processing apparatus according to claim 1, wherein the determination of the realizable function includes a determination that execution of the script data corresponding to the acquired executable function data is not permitted, in a case where the determined realizable function coincides with the acquired restricted function data.

6. A control method of an image processing apparatus, the apparatus comprising a processor and a memory having stored thereon instructions which when executed by the processor execute functions described by script data, the control method comprising:

acquiring restricted function data indicating functions whose execution by a user of the image processing apparatus is restricted;

acquiring executable function data indicating a plurality of functions to be called by the script data;

determining a realizable function which is realized by executing a plurality of executable functions that are called by the script data; and determining whether to permit execution of the script data by the processor corresponding to the executable function data, based on the acquired restricted function data and the determined realizable function, wherein determining whether to permit execution of the script data corresponding to the executable function data is performed regardless of whether or not each of the executable functions to be called by the script data is restricted by the restricted function data.

7. The control method according to claim 6, further comprising:

acquiring callable script data; and displaying a list of the acquired callable script data, and displaying the script data determined to not be executable to the user in an identifiable form.

8. The control method according to claim 6, further comprising:

notifying the user of a result of the determination whether to permit execution of the script data corresponding to the executable function data.

9. The control method according to claim 6, further comprising:

notifying an external module that instructed execution of the script data of a result of the determination whether to permit execution of the script data corresponding to the executable function data.

10. The control method according to claim 6, wherein in determining whether to permit execution of the script data corresponding to the executable function data it is determined that execution of the script data corresponding to the acquired executable function data is not permitted, in a case where the determined realizable function coincides with the acquired restricted function data.

11. A non-transitory computer readable storage medium retrievably storing a computer program that causes a computer to execute a control method, the control method comprising:

acquiring restricted function data indicating functions whose execution by a user of the image processing apparatus is restricted;

acquiring executable function data indicating a plurality of functions to be called by script data;

determining a realizable function which is realized by executing a plurality of executable functions that are called by the script data; and determining whether to permit execution of the script data corresponding to the executable function data, based on the restricted function data acquired and the realizable function determined, wherein determining whether to permit execution of the script data corresponding to the executable function data is performed regardless of whether or not each of the executable functions to be called by the script data is restricted by the restricted function data.

* * * * *